H. W. BROWN.
ELECTRICAL PROTECTIVE DEVICE.
APPLICATION FILED DEC. 19, 1913.

1,238,251. Patented Aug. 28, 1917.

WITNESSES:

INVENTOR
Harold W. Brown
BY
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,238,251.　　　　　Specification of Letters Patent.　　Patented Aug. 28, 1917.

Application filed December 19, 1913. Serial No. 807,708.

*To all whom it may concern:*

Be it known that I, HAROLD W. BROWN, a citizen of the United States, and a resident of Ithaca, in the county of Tompkins and State of New York, have invented a new and useful Improvement in Electrical Protective Devices, of which the following is a specification.

My invention relates to electrical protective and regulating devices and particularly to relays, and it has for its object to provide a relay which will operate at a predetermined volt-ampere load.

With the advance of electrical engineering, it has become necessary to supply regulating, measuring and protective apparatus for circuits which operate in proportion to the volt-ampere load on the circuit. The particular application for such apparatus is in systems where the power is delivered at a constant potential irrespective of the power factor and charged for on the basis of volt-amperes and not watts, as, for example, in hydro-electric plants where it costs no more to generate at one power factor than at another. In my invention, I provide a relay which protects a circuit from overloads by the adaptation of a watt-meter with a power-factor correcting device.

Figure 1:
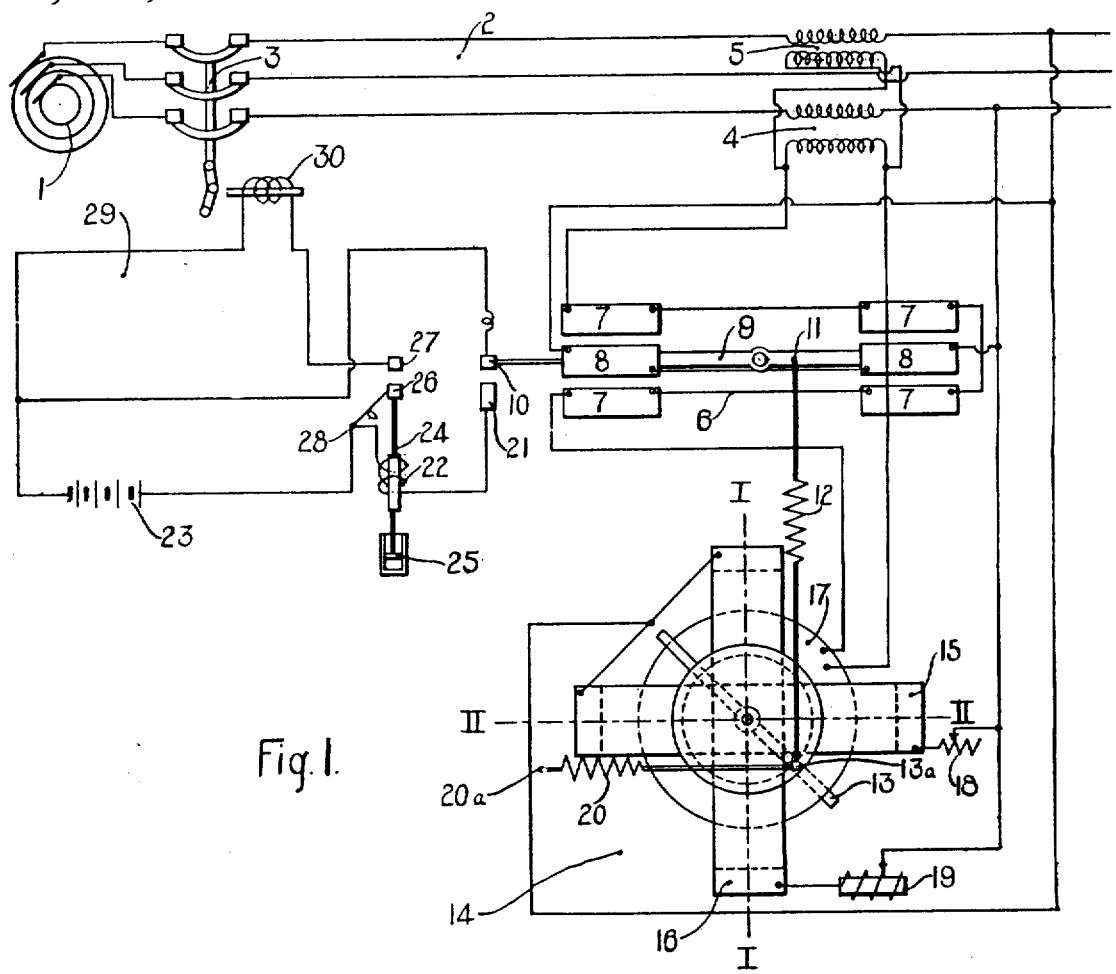
Figure 2:
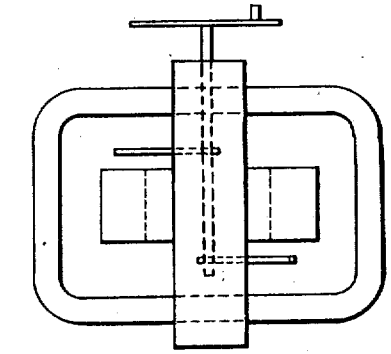

In the accompanying drawings, Figure 1 is a diagrammatic view of an electrical circuit which is protected by a relay embodying my invention, and Fig. 2 is an elevational view of the power factor meter shown in Fig. 1.

My invention is used to disconnect a motor 1 from a circuit 2 by a circuit breaker 3 when the motor takes a certain predetermined volt-ampere load. Current is supplied to the relay by transformers 4 and 5, the secondary windings of which are connected in parallel. My invention comprises a Kelvin balance type of wattmeter 6 having four stationary coils 7 connected in series and supplied with current through the transformers 4 and 5, and movable coils 8 supplied with current that is proportional to the voltage of the balanced circuit 2, the coils 8 being carried by a pivotally mounted member 9 which also carries a contact member 10. To a point 11 on the member 9 is attached one end of a spring 12 the other end of which is attached to the movable member 13 of a power-factor meter 14. The power-factor meter comprises voltage coils 15 and 16 and a current coil 17. The coil 15 is connected in series with a resistor 18 and the coil 16 is connected in series with a reactor 19. The movable member 13 of the power-factor meter 14 has one end of a second spring 20 connected to it, the other end of the spring being connected to a stationary point 20ª. The contact member 10 engages a stationary contact member 21 which is connected through a magnet coil 22 and a battery 23 to the contact member 10. The magnet coil 22 operates a relay armature 24 having a dash pot 25 and causes contact members 26 and 27 to engage each other. The contact member 26 being connected to a point 28, completes a circuit 29 through the battery 23 and a trip coil 30 to the contact member 27.

The adjustment of the power factor meter should be such that, at zero power factor, the spring 12 is to the right of the axis I—I, and a point 13ª is on the axis II—II, and at 100% power factor, the point 13ª is in the axis I—I. When the spring 12 is in its position of zero power factor, there will be practically zero tension on it, or just sufficient tension to counter-balance a calibrating or adjusting weight (not shown) on the moving element 9 of the wattmeter 6. The tension of the spring 12 is proportional to the cosine of the angle through which the point of attachment 13ª is rotated from a vertical position. This corresponds to the cosine of the electrical angular displacement between current and voltage, or the power factor of the circuit. Thus, the force exerted by the spring 12 in opposition to that which tends to move the contact member 10 into engagement with the contact member 21 when the load reaches a predetermined amount corresponds to the power factor. Since the torque exerted by the wattmeter to move the contact member 10 into engagement with the member 21 is proportional to the power factor, the operation of the relay is the same at high as at low power factor. Of the three elements entering into the torque of a wattmeter, viz. current, voltage and power factor, only the current and voltage are effective; hence, the relay is a volt-ampere instead of a watt relay, as would be the case if the spring 12 were connected to a fixed point instead of the movable point 13ª.

It is assumed that the power factor meter would assume its correct position for the various power factors if no account were taken of the effect of the spring 12 on the position of the moving element 13, but, since the torque of the spring 12 is considerable, it affects the position of the moving element 13, but this effect can be compensated by placing the second spring 20 as shown in the drawing. The torque exerted by the spring 12 upon the movable member 13, being the force multiplied by the moment arm, is proportional to the cosine of the angle of rotation from the lower position of the point 13ᵃ multiplied by the sine of the same angle, for the force is proportional to the cosine, and the moment arm to the sine. Similarly, the torque exerted by the spring 20 in the opposite direction, is proportional to the cosine multiplied by the sine, for the force is proportional to the sine, and the moment arm to the cosine of the same angle, as was previously mentioned. Thus, the spring 20 counteracts the effect of the spring 12 on the movable element 13 of the power factor meter 14.

The operation of my invention is as follows: When an excessive predetermined load is transmitted over the circuit 2 to a motor 1, the contact member 10 will engage the stationary contact member 21 at a certain volt-ampere load, as hereinbefore described, causing the magnet coil 22 to be energized which, after a predetermined time, will cause the contact member 26 to engage the contact member 27, to thus energize the trip coil 30 of the circuit breaker 3 and interrupt the circuit.

As the principles of operation of a Kelvin balance type of wattmeter and a power factor meter are understood by those versed in the art, a description of the operation of the same will not be given here.

Various other operations, besides that of interrupting a circuit, may be controlled by my invention, such as that of a regulator, or that of an indicating instrument. I do not limit my invention to any particular type of watt and power factor meters or to any particular type of control apparatus, except as set forth in the appended claims.

I claim as my invention:

1. In a protective device for an electric circuit, the combination with means for measuring power, of means for measuring power-factor, said means being operatively connected together to cause the said power-measuring means to be actuated when a predetermined volt-ampere load traverses the circuit.

2. In a protective device for an electric circuit, the combination with a wattmeter, of a power-factor meter, and means for so resiliently connecting the said wattmeter and the said power-factor meter in operative relation to each other that the said wattmeter is actuated in accordance to the volt-amperes in the circuit under predetermined conditions.

3. An electrical protective device comprising a wattmeter, a power-factor meter, a resilient means for operatively connecting the said power-factor meter and the said wattmeter, and a resilient means connected between the said power-factor meter and a stationary member.

4. An electrical device comprising a wattmeter and a power-factor meter, said meters being so connected that the effect of the power factor as measured by the power-factor meter is eliminated from the indications of the wattmeter when a predetermined load traverses the circuit to which the device is connected.

5. An electrical relay comprising a meter the torque of which is proportional to watts, a meter which assumes an angular position corresponding to power factor, a resilient means for so connecting the said meters that said power-factor meter exerts a torque on said wattmeter in accordance with the power factor of a circuit, and a spring for neutralizing the torque on the power-factor meter of the said resilient connecting means.

6. A relay for an electric circuit comprising a wattmeter, a power-factor meter, a spring for operatively connecting the movable member of the said wattmeter to the movable members of the said power-factor meter, a second spring acting substantially at right angles to said first spring, and means actuated by said relay when a predetermined volt-ampere load traverses the circuit.

7. A relay for an electric circuit comprising a wattmeter and a power-factor meter connected to the circuit, a spring, one end of which is connected to the movable member of said wattmeter and the other end to the movable member of said power-factor meter, a second spring connected at one end to a stationary member and at the other end to the movable member of said power-factor meter, said springs being normally disposed substantially at right angles to each other, and means actuated by said wattmeter for controlling the interruption of the circuit when a predetermined volt-ampere load traverses the circuit.

8. A volt-ampere relay for an electric circuit comprising a wattmeter and a power-factor meter, said meters being so connected as to eliminate the effect of the power factor of the circuit on the operation of the wattmeter under predetermined conditions.

9. A volt-ampere responsive device for an electric circuit comprising a wattmeter, a power-factor meter and means for so connecting the movable members of the said meters that the wattmeter will be actuated in accordance with the volt-amperes traversing the circuit when a predetermined load traverses the circuit.

10. An electro-responsive device comprising means responsive to the power traversing a circuit, means responsive to the power-factor of the circuit and means for so operatively connecting the said means together that the power-responsive means will be actuated when a predetermined volt-ampere load traverses the circuit.

11. A relay device for an electric circuit comprising means responsive to the power traversing the circuit, means responsive to the power-factor of the circuit and means for so operatively connecting the said means together that the effect of the power-factor of the circuit on the operation of the power-responsive means is eliminated under predetermined conditions.

In testimony whereof, I have hereunto subscribed my name this 28th day of November 1913.

HAROLD W. BROWN.

Witnesses:
 FRED L. CLOCK,
 L. C. PROCTOR.